ANSWER TONE DETECTION CIRCUIT

Filed Oct. 11, 1968 2 Sheets-Sheet 1

INVENTOR
G. C. PRINS
BY [signature]
ATTORNEY

ANSWER TONE DETECTION CIRCUIT

Filed Oct. 11, 1968 2 Sheets-Sheet 2

United States Patent Office 3,536,839

Patented Oct. 27, 1970

3,536,839

ANSWER TONE DETECTION CIRCUIT

Gerard C. Prins, North Beach, N.J., assignor to Bell Telephone Laboratories, Incorporated, Murray Hill and Berkeley Heights, N.J., a corporation of New York Filed Oct. 11, 1968, Ser. No. 766,855
Int. Cl. H04m *11/00*
U.S. Cl. 179—2 7 Claims

ABSTRACT OF THE DISCLOSURE

A data set which dials a telephone number and transmits data upon receipt of answer tone has been modified to be compatible with semiautomatic switching systems which employ intercept operators. After the number has been dialed, a voice recording of the data set's telephone number is transmitted. A receiver at the data set is periodically enabled while the voice transmission is interrupted to listen for answer tone to indicate a completed connection. If answer tone is detected during a short listening interval, the listening interval is increased to confirm receipt of answer tone.

FIELD OF THE INVENTION

This invention relates to an answer tone detection system and particularly to an answer tone detection system employed in an automatic dialing data set used in a telephone system requiring an intercept operator.

BACKGROUND OF THE INVENTION

Alarm reporting data sets exist which go off hook in response to an alarm condition, outpulse a telephone number of a remote station and, upon receipt of an answer tone signal transmit a message, usually an alarm signal. When the alarm reporting data set is connected in a telephone system employing intercept operators, answer tone is not sent back from the remote station until the intercept operator receives the data set's identifying number and completes the connection.

To identify the data set to the intercept operator, a voice recording of the number is transmitted at the termination of the outpulsing. To insure that the operator gets the message, the recording of the voice signal is repeated until answer tone is received indicating completion of the connection. It has been found that the level of answer tone reaching the sending data set cannot be accurately distinguished in the presence of the locally generated voice signal.

In some communication systems, a transmitter is disabled during periods of silence to allow a receiver to listen for emergency signals. It has been found that the circuitry required to gate a receiver on during periods of silent transmission is not economically feasible.

A second approach to the problem is to periodically disable the transmitter and enable the receiver. It has been found that interruption of the voice signal for a time sufficient to definitely detect a voiceband answer tone signal renders the voice signal incomprehensible.

BRIEF DESCRIPTION OF THE INVENTION

To overcome the above-mentioned problems, an alarm reporting data set which transmits a voice recording of the data set's identifying telephone number is modified in accordance with the teaching of this invention. The voice recording is periodically interrupted for brief time intervals while an answer tone detection circuit is enabled. The brief tone intervals are sufficiently short not to render the voice message incomprehensible.

If answer tone is detected during the brief interval, the interruption of the voice recording is extended to positively confirm receipt of answer tone. If receipt of answer tone is confirmed, a data message is transmitted. If, on the other hand, receipt of answer tone is not confirmed, the voice recording is reinitiated with the brief answer tone detecting interruptions.

In this way, a system is provided which both insures intelligible transmission of the voice recording and certain confirmation of answer tone receipt while employing a minimum of circuitry.

DETAILED DESCRIPTION

Figure 1:
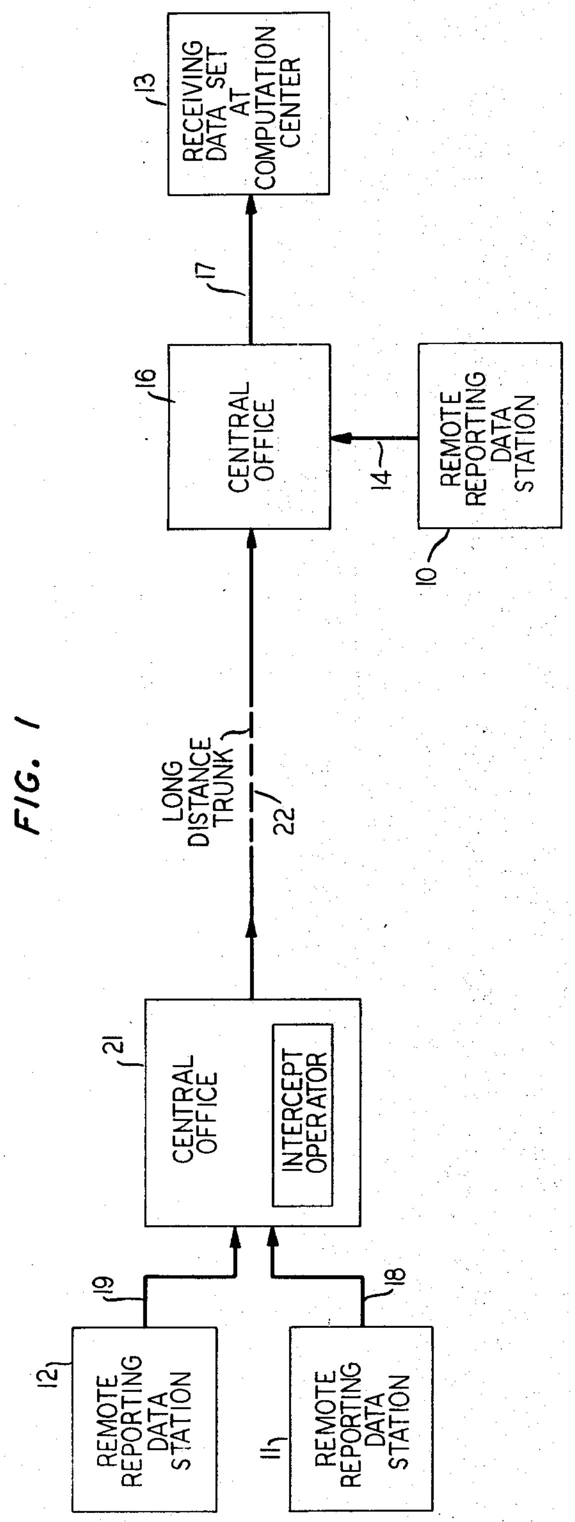
FIG. 1 shows in block diagram form a telephone system in which answer tone detection systems built in accordance with this invention may be employed.

FIG. 1 shows three remote reporting stations 10, 11, and 12, connected to a receiving data set 13, located at a remote computation center. The data stations 10, 11, and 12 are interconnected with the computation center by existing telephone equipment. The remote reporting station 10 is connected by a trunk 14 to central office 16 which in turn is connected to the receiving data set 13 by trunk circuit 17.

When a condition exists at the remote reporting station 10 requiring a connection to the receiving data set 13, the telephone number of the receiving data set is outpulsed by the remote reporting data station 10. A connection is then cut through central office 16 connecting the remote data station 10 through trunk 17 to the receiving data set 13. Upon completion of the connection, answer tone is transmitted back from the receiving data set 13 to the remote reporting station 10 which initiates transmission of a data message by remote reporting station 10.

Remote reporting stations 11 and 12 are connected by trunks 18 and 19, respectively, to a central office 21. The central office 21 is connected by long distance trunk 22 to the central office 16. In this example, central office 21 is not equipped for fully automated direct distance dialing. To complete a long distance call, an intercept operator is required to obtain the sending station's number for billing purposes before the call is cut through. Remote reporting stations 11 and 12 are therefore equipped with voice announcement units which repeatedly broadcast the respective station's telephone number to enable the intercept operator to complete the call. Upon completion of the connection through to receiving data set 13, answer tone is again sent back to the sending data station. The answer tone signal enables the remote reporting station 11 or 12 to terminate transmission of the voice message and initiate transmission of the data message.

Figure 2:
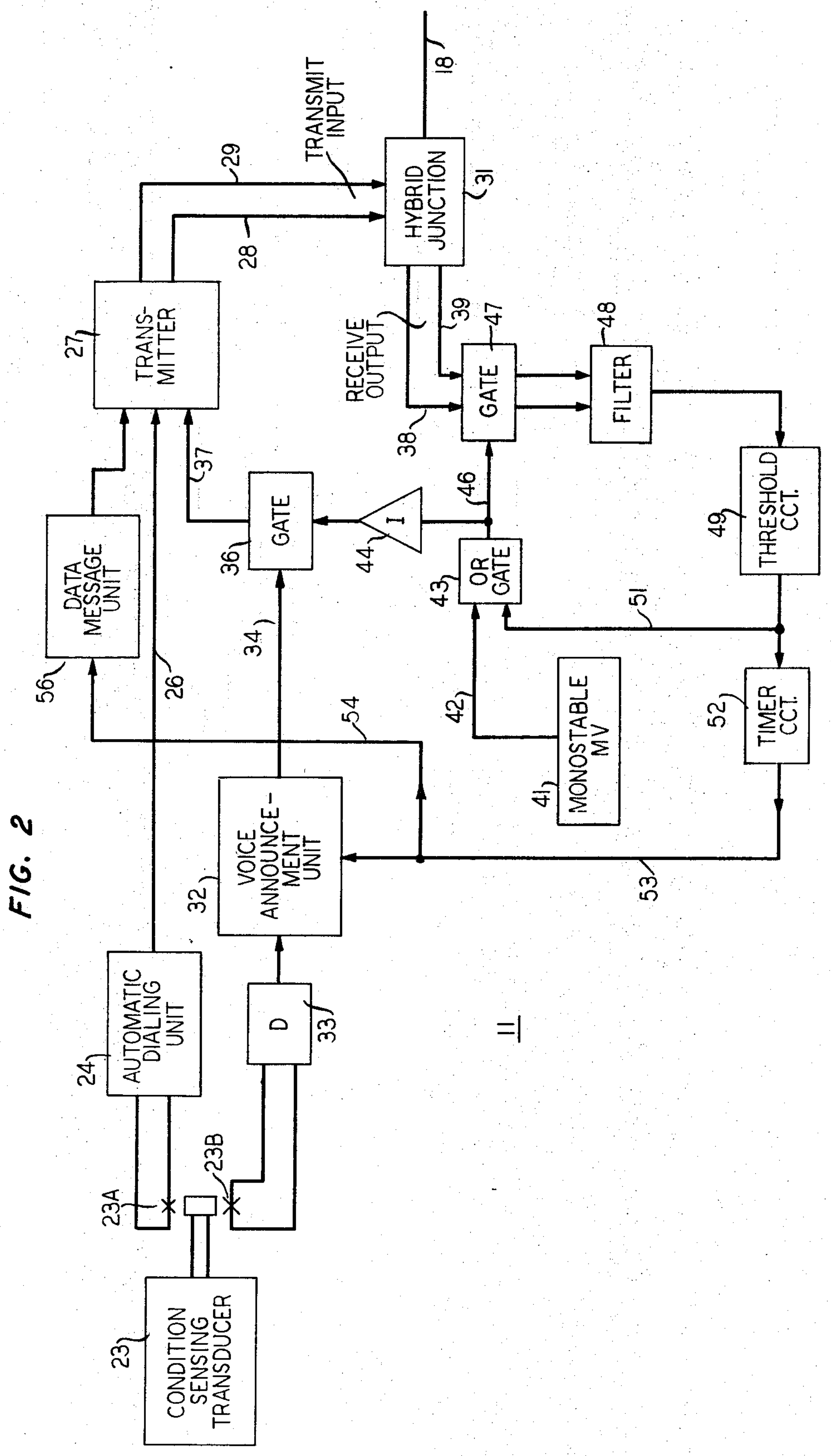
FIG. 2 is a block diagram of a system embodying the principles of this invention.

A better understanding of the cooperation of a remote reporting data station, for example, remote reporting data station 11 with existing telephone plant, and an understanding of the detailed operation thereof can be had by referring to FIG. 2. The remote reporting data station 11 is designed to initiate a connection to a remote location and then transmit a data message in response to a predetermined condition, for example, an alarm indication from a condition-sensing transducer, such as condition-sensing transducer 23. Condition-sensing transducer 23 may include a thermocouple, a strain gauge, a meter relay or any other similar device. When the predetermined condition is sensed, condition-sensing transducer 23 operates to place remote reporting data station 11 in an off-hook condition by means of a relay, not shown, and operates to close normally open contacts 23*a* and 23 *b*.

Contact 23*a* actuates an automatic dialing unit 24 which outpulses the telephone number of a receiving data set 13. The signal from automatic dialing unit 24 is transmitted by lead 26 to a transmitter 27. Leads 28 and 29 carry the signal to hybrid junction 31 applying the signal to trunk 18. Trunk 18, see FIG. 1, brings the signal to central office 21. At central office 21, the signal is identified as a long distance call and transferred to the switchboard of an intercept operator.

The intercept operator has no way of knowing that the call is originating from a data station rather than an individual. The operator, therefore, connects into the line and asks for the originating party's number.

To provide the intercept operator with the information necessary for proper completion of the connection, data station 11, refer again to FIG. 2, is equipped with a voice announcement unit 32. The voice announcement unit is actuated a fixed time, determined by delay element 33, after the use of contact 23*b*. The delay provided by delay element 33 is set so that the outpulsing of automatic dialing unit 24 is completed before actuation of the voice announcement unit 32. Voice announcement unit 32 may be a tape recorder having an endless tape which reports the identifying telephone number of the data set 11. This voice message from the unit 32 is applied by lead 34 to a transmission gate 36. The transmission gate 36 normally allows the signal applied thereto to pass by lead 37 to transmitter 27 and then along the path previously described to the central office 21.

After the intercept operator hears the telephone number sent from the remote reporting station 11, she completes the connection by way of long distance trunk 22, central office 16, trunk 17 to receiving data set 13. When the connection is completed to the receiving data set 13, answer tone is sent back along this path to the remote reporting station 11.

The answer tone signal is applied by trunk 18 to hybrid junction 31 which provides answer tone signal on leads 38 and 39. If the hybrid junction 31 could effectively isolate the voice signal on leads 28 and 29 from the received answer tone signals on leads 38 and 39, answer tone could easily be detected. With existing equipment, however, a certain amount of the signal on leads 28 and 29 is fed through and appears on leads 38 and 39. Due to the high power level of the signal on leads 28 and 29 and the low power level of the answer tone received by the data station 11, it is difficult to distinguish answer tone from similar frequency components in the fixed signal.

Therefore, monostable multivibrator 41 provides a gating signal 25 milliseconds long once every second to interrupt transmission of the voice signal. The gating signal is applied by lead 42 through OR gate 43 and inverter 44 to disable gate 36 during the 25 millisecond pulse. In this way, the fixed signal from the voice announcement unit is not applied through transmitter 27 and leads 28 and 29 to the hybrid junction 31 during this interval. It should be clear that it is just a question of choice whether the voice signal is gated or the voice announcement unit is disabled. The gating signal from OR gate 43 is also applied by a lead 46 to a normally off transmission gate 47 to momentarily pass the signal on leads 38 and 39. In this way, answer tone signal, free from voice signal interference, is passed to filter 48. The filter 48 is followed by a threshold circuit 49 which provides an output signal if the output from filter 48 exceeds a fixed level. The threshold circuit may be a Schmitt trigger or simply a relay. The threshold circuit 49 is designed to include about a two-millisecond hysteresis so that once it is actuated, a signal will be provided during brief interruptions of answer tone.

If answer tone is not detected during the 25 millisecond interval, voice announcement is continued and no signal is provided to the filter 48 until the next 25 millisecond pulse arrives. If, on the other hand, a signal is provided by the threshold circuit 49, a lead 51 applies this signal to OR gate 43 continuing interruption of the voice signal and receipt of answer tone to the filter 48.

The output of threshold circuit 49 is also applied to a timer circuit 52. Timer circuit 52 may include an integrator followed by a level sending circuit. When answer tone has persisted for a predetermined time, typically 250 milliseconds, a signal is provided by timer 52 on lead 53 to disable voice announcement unit 32. Lead 54 applies this signal to a data message unit 56 to enable transmission of the data message.

It is to be understood that the above-described arrangement is illustrative of the application of the principles of this invention. Numerous other arrangements may be devised by those skilled in the art without departing from the spirit and scope of the invention.

What is claimed is:

1. In combination:

a first signal generating means normally connected to a transmit-receiver terminal;

means for detecting signals applied thereto;

means responsive to a control signal for connecting said detecting means to and disconnecting said first signal generating means from said transmit-receiver terminal;

means for periodically generating said control signal for a first predetermined time interval; and means responsive to signals being detected by said signal detecting means for prolonging generation of said control signal.

2. The combination as defined in claim 1 in which said control signal is generated so long as signals are detected by said signal detecting means.

3. The combination as defined in claim 1 also including:

means responsive to signals being detected by said signal detecting means for a predetermined time interval for disabling said first signal generating means.

4. The combination as defined in claim 3 in which said disabling means also enables a second signal generating means.

5. A condition reporting data set including:

means responsive to a predetermined condition for providing a connection initiating signal;

means responsive to said connection initiating signal for outpulsing a characteristic signal of a remote receiving location;

means responsive to said connection initiating signal for initiating voice announcement of said data set's identifying number a fixed time after termination of said outpulsing, said voice announcement means responsive to a control signal for terminating voice announcement;

normally disabled means responsive to receipt of an answer tone signal for providing said control signal; and means for periodically disabling said voice announcement means and enabling said normally disabled means.

6. A data set as defined in claim 5 above including:

means responsive to said control signal for transmitting a data message.

7. The combination as defined in claim 5 in which said normally disabled means includes:

a first portion responsive to receipt of said answer tone signal for prolonging the disabling of said voice announcement means and enabling of said receiving means; and a second portion responsive to receipt of said answer tone signal for a predetermined time for providing said control signal.

References Cited

UNITED STATES PATENTS 2,318,267 5/1943 Taylor.
3,376,389 4/1968 Fair.

RALPH D. BLAKESLEE, Primary Examiner

U.S. Cl. X.R.

179—5, 27